United States Patent Office 3,523,090
Patented Aug. 4, 1970

3,523,090
POLYURETHANE PLASTIC FROM
RESIN ACID DIOLS
Bernard A. Parkin, Jr., Lake City, Fla., Hugh B. Summers, Jr., Savannah, Ga., and Glen W. Hedrick, Lake City, Fla., assignors to the United States of America as represented by the Secretary of Agriculture
No Drawing. Original application June 11, 1968, Ser. No. 562,951. Divided and this application Apr. 11, 1968, Ser. No. 738,749
Int. Cl. C09k 3/00; H05b 33/00
U.S. Cl. 252—182         1 Claim

ABSTRACT OF THE DISCLOSURE

A saturated diol prepared by the hydrolysis and the subsequent double bond and functional group reduction of the formaldehyde adduct of levopimaric acid. The diol is a useful glycol extender for the production of polyurethane foams and rubbers.

A non-exclusive, irrevocable, royalty-free license in the invention herein described, throughout the world for all purpose of the United States Government, with the power to grant sublicenses for such purposes, is hereby granted to the Government of the United States of America.

This application is a division of application bearing Ser. No. 562,951, filed June 30, 1966.

This invention relates to a method for the preparation of diols from pine gum resin acids and to the products so produced. More specifically, it deals with a process for first forming a formaldehyde-levopimaric acid adduct (II) and, subsequently, converting this adduct to 6-(hydroxymethyl) abietic acid (III), 6-(hydroxymethyl) dihydroabietic acid (IV), 6-(hydroxymethyl) tetrahydroabietinol (V), 6-hydroxymethyl( abietinol (VI), and to the formaldehyde adduct of abietinol (VII). The 6-hydroxymethyl) abietinol (VI) is useful in the preparation of protective coatings and has the air drying capacity of rosin. The saturated diol (V) may be prepared from the other compounds as intermediates or directly from the adduct (II) in one step. The saturated diol is useful in the preparation of polyurethane foams and rubbers. Most important, when the saturated diol is used as a partial replacement for polyethylene glycols and/or polypropylene glycols in the production of polyurethanes, the resultant films and coatings have improved hardness, toughness, and are clear and colorless.

The term "pine gum," as used in this specification and the claims, relates to crude pine gum and particularly to one of the main components of crude pin gum, levopimaric acid, which is present in amounts ranging from about 18 to 30 weight percent. Since levopimaric acid is thermally unstable and is *lost* in the conversion of pine gum into rosin, levopimaric acid will be referred to below as a "resin acid." The structure and numbering system of levopimaric acid follows:

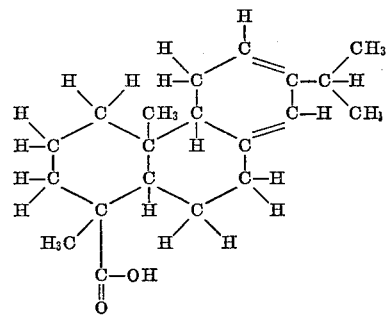

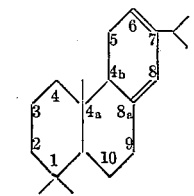

Levopimaric acid (I)

The nomenclature is that of Fieser and Fieser (Natural Products Related to Phenanthrene by Fieser and Fieser, third edition, 1949, page 40, Published by Reinhold Publishing Corporation, New York, N.Y.)

As noted above, levopimaric acid (I) constitutes about one-fifth of the total acid content of pine gum. As will be seen from the chemical structure, it contains double bonds at the 6–7, 8–8a positions. This conjugated system reduces its resistance to the heat required in the distillation of turpentine. Consequently, the residue (rosin) contains little, if any, levopimaric acid.

It has been observed that upon heating levopimaric acid (I) with formaldehyde under certain conditions, a hydroxy acid was obtained which gave an ultraviolet (U.V.) absorption spectrum almost identical in form with that of abietic acid, but with a principal maximum at 243 millimicrons instead of the expected 241 millimicrons. Rearrangement to an abietic-type double-bond system had apparently taken place with substitution of a methylol group on a carbon of the conjugated double-bond system. Substitution of a methylol group on a carbon of the conjugated double-bond system of abietic acid should, according to Woodward rules, have given a shift of the U.V. maximum to 246 millimicrons. Such a shift was observed by E. E. Royals and J. T. Greene (J. Org. Chem., 23, 1,437 (1958)) as a result of the Prins reaction on abietic acid.

However, by careful control of the reaction conditions and the conditions of product isolation, we isolated a crystalline intermediate which showed no U.V. absorption above 210 millimicrons and contained no free hydroxyl group. This product resulting from the Diels-Alder-type addition of formaldehyde to levopimaric acid is shown below and will be designated as adduct (II), Diels-Alder adluct (II), or just (II). The structural formula of adduct (II) is

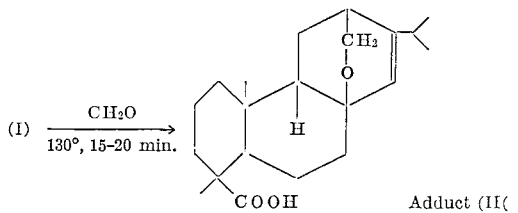

Adduct (II)

Purified adduct (II) is somewhat unstable, and is easily converted to 6-hydroxymethylabietic acid (III) on heating, or by treatment at room temperature with dilute mineral acids.

The structural formula for (III) is

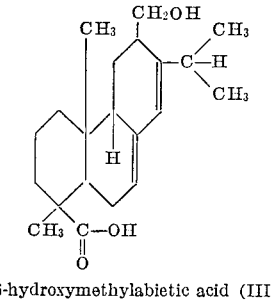

6-hydroxymethylabietic acid (III)

Hydrogenation of (III) over a palladium-on-carbon (Pd-C (5%)) catalyst eliminated one of the double bonds and produced 6-hydroxymethyldihydroabietic acid (IV).

The structural formula for (IV) is:

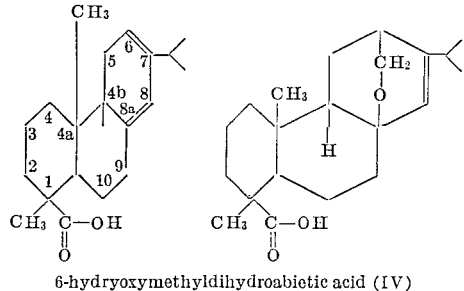

6-hydryoxymethyldihydroabietic acid (IV)

When IV is hydrogenated over a copper chromite catalyst, the last double bond is removed and, simultaneously, the carboxylic group is converted to a hydroxymethyl group. The resulting product is 6-hydroxymethyl-tetrahydroabietinol (V) frequently referred to below as (diol) (abietyl glycol), or simply as (V). This is a *saturated* glycol.

The structural formula for (V) is

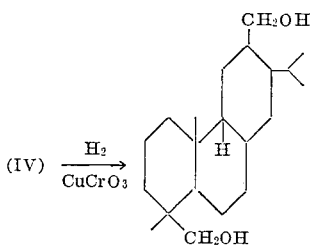

6-hydroxymethyltetrahydroabietinol (V) (diol)

The abietyl glycol (V) may be accomplished in a single step by hydrogenating the adduct (II) by means of the catalyst copper chromite.

It is a prime object of our invention to convert, stepwise, resin acids from pine gum to 6-hydroxymethyltetrahydroabietinol (diol) (V).

It is a further object to first prepare the levopimaric acid-formaldehyde adduct (II) from the purified levopimaric acid and/or pine gum.

It is a still further object to convert the levopimaric acid-formaldehyde adduct by cleavage of the internal ether and rearrangement in dilute acid solution to 6-hydroxymethylabietic acid (III).

It is a still further object to convert, through hydrogenation in the presence of a palladium-on-carbon (5%) catalyst, the 6-hydroxymethylabietic acid to 6-hydroxymethyldihydroabietic acid (IV).

It is a still further object to conver, through hydrogenation in the presence of a copper-chromite catalyst the 6-hydroxymethyldihydroabietic acid to the diol (V). This diol is a saturated compound and, as noted above, may be combined in varying proportions with other saturated glycols such as polyethylene glycol (e.g., polyethylene glycol 200) or with polypropylene glycol, (e.g. polypropylene glycol 2000) in the preparation of polyurethane foams and rubbers.

It is also within the scope of our invention to convert, through reduction by means of lithium aluminum hydride and alkaline hydrolysis, the carboxylic acid group of adduct (II) to the novel 1-hydroxymethyl form of adduct which is designated herein as (VI). The latter (VI) is readily converted to (VII) by means of dilute mineral acid, and (VII) can be converted to 6-hydroxymethyltetrahydroabietinol (V) (diol) by the copperchromite catalyst mentioned above.

The details of these various objects are described in the accompanying examples wherein temperatures are in centigrade degrees; B.P. is boiling point; mm. is millimeters pressure (mercury); OHE or (ohe) is hydroxyl equivalent and was determined by the method of C. L. Ogg, W. L. Porter, and C. O. Willits, Ind. Eng. Chem., Anal. Ed., 17, 394 (1945). The procedure follows:

MIXED INDICATOR SOLUTION

Consists of one part of 0.1% aqueous cresol red neutralized with sodium hydroxide and three parts of 0.1% thymol blue neutralized with sodium hydroxide.

PROCEDURE

Weigh a sample of any product to be treated which may contain about from 1–2.5 milliequivalents of hydroxyl and introduce into a glass-stoppered iodine flask. Add 3.00 ml. of a freshly prepared acetylating reagent (1 volume of acetic anhydride to 3 volumes of pyridine) using a pipet or some other means of accurate measurement. Moisten the glass stopper with pyridine and seat loosely, and then place the flask on a steam bath and heat for 45 minutes. Add 5–6 ml. of water and swirl to mix thoroughly. Continue heating for 2 minutes and then cool in tap water. Rinse down the stopper and sides of the flask with 10 ml. of butyl alcohol, and then add a few drops of indicator and titrate with the standard sodium hydroxide (0.5 N). Make a blank determination on the reagent simultaneously and similar in all respects.

If the sample contains any free acid or alkali, this should be determined separately and corrected for in the calculation.

Calculation

Hydroxy equivalent (OHE) =

$$\frac{\text{Weight of sample in mg.}}{(\text{tier of blank (ml.)} - \text{titer of sample (mg.)})}$$

where N = normality of NaOH solution.

The following terms are defined for subsequent use in the disclosure which follows: "(n.e.)" or "ne" is neutralization equivalent and for resin acids is equal to the molecular weight; "$H_aE$" is active hydrogen equivalent, i.e., the grams of the sample required to evolve 1 mole of hydrogen on treatment with excess lithium aluminum hydride ($LiAlH_4$); p.s.i.g. or p.s.i. is pounds per square inch gage; mu is millimicrons; Pd–C (5%) is 5% palladium-on-carbon catalyst (Girdler G 81–C); n.m.r. (or NMR) is nuclear magnetic resonance and is determined by means of a Varian A–60 spectrophotometer; $\eta_{inh.}$ is inherent

EXAMPLE I

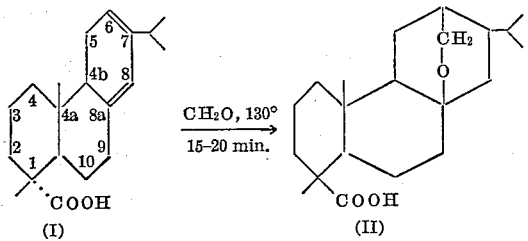

Preparation of adduct (II) from levopimaric acid (I)

Resin acids (100 grams, having neutralization equivalent (n.e.) of 305 and containing 89 grams (0.295 mole) of levopimaric acid (I)) were mixed with powdered paraformaldehyde (24.6 grams, 0.82 mole) (aqueous formaldehyde has been used) and mineral spirit (30 ml.) in a 300 ml. three-neck flask equipped with a paddle stirrer and reflux condenser. The flask was immersed in an oil bath maintained at 130° and the mixture was stirred vigorously. The solids fused, or dissolved, to a mobile fluid and then, after 15 minutes, solids precipitated and the mixture became quite viscous. Stirring and heating were continued for another 20 minutes. The flask was removed from the oil bath and ether (100 ml.) was added. The ether insoluble product was removed by filtration and washed with ether (2× 50 ml.). The dried product which contained some paraformaldehyde weighed 89.6 grams and accounted for 86.4% of the original levopimaric acid. Same procedure without solvent gives about the same results. Inclusion of solvent, mineral spirits facilities mixing.

*Analysis.*—Calcd. for $C_{21}H_{32}O_3$; n.e. 332.25. Found: n.e. 352.

The filtrate contained 4% of the original levopimaric acid unreacted. The 9.0% unaccounted for was probably converted to 6-hydroxymethylabietic acid (III) or other abietic-type resin acids. In one run the filtrate was treated with lithium aluminum hydride ($LiAlH_4$) in order to reduce the hydroxyacids to diols. By this method 66.8 grams adduct (0.201 mole) and 29.2 grams diol (.09 mole), 99% overall yield was obtained. A repeat run gave a yield of 95.4%.

EXAMPLE 2

Preparation of adduct (II) from pine gum (Lab. Prep.)

Adduct (II) was also prepared directly from crude pine gum. The following examples will serve to illustrate the process.

Crude pine gum (400 grams, containing 22%, 70.6 grams) 0.291 mole levopimaric acid and 10% water) was mixed with flake paraformaldehyde (35 grams, 1.16 mole) in a one liter three-neck flask equipped with a heating mantle, reflux condenser and paddle stirrer. The mixture was heated to reflux at 100° C. in 15 minutes and was stirred vigorously at reflux for 45 minutes. Heptane (500 ml.) was added, the solution filtered and allowed to stand 72 hours at room temperature for crystallization. The product was isolated by filtration, the cake washed with heptane and the solid dried to give 61.8 grams of material, n.e. 337.0 and accounting for 62.8% of (I) present in the original charge. There was 4.02 grams, 5.7%, unchanged acid in the filtrate leaving 22.4 grams or 31.3% unaccounted for which was probably converted to hydroxyacid or other resin acids of the abietic type.

EXAMPLE 3

Pilot plant production of adduct (II) from pine gum

Adduct (II) was prepared in the pilot plant in a 35 gallon jacketed kettle heated by circulating "Dowtherm." Crude longleaf pine gum (81 pounds, containing 17 pounds, 0.056 mole of levopimaric acid) was mixed with powdered paraformaldehyde (7.5 pounds, 0.25 mole) and water (6.5 pounds). The charge was stirred and heated for 55 minutes to reflux. The heater was shut off but the Dowtherm was circulated for an additional 40 minutes to maintain refluxing. The temperature of the charge at reflux was normally 98.5–99.5° C. Heptane (12 gallons) was added and the batch was immediately filtered through a pressure filter and allowed to stand for 40 hours. The adduct was isolated by filtration using a vacuum filter and washed with heptane. Air drying gave 10.1 pounds of material, n.e. 353, 94% pure accounting for 51% of the levopimaric acid originally charged.

In a typical recrystallization 23.6 pounds of the crude product was dissolved in 28.4 gallons of hot benzene, filtered and allowed to crystallize at 10° C. Filtration and drying gave 20.2 pounds of product (III), 90.3%, n.e. 334.

Distillation of the original filtrate allowed recovery of the solvent, normal turpentine (94–97% of that obtained directly from the gum), and a resin which after steam sparging had color grade WO, softening point (ring and ball) 60°, n.e. 350, and hydroxyl equivalent (OHN) 1341. This is equivalent to a rosin having a hydroxyl content of 1.2% and should be compared with that of commercial rosin which is about 1%.

EXAMPLE 4

In the following example Adduct (II) is converted to 6-hydroxymethylabietic acid (III) sometimes referred to as 6-methylolabietic acid (III).

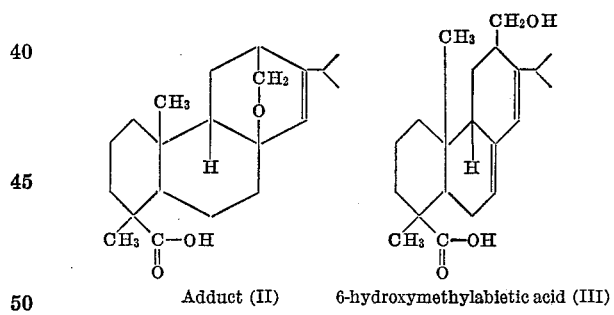

Adduct (II)  6-hydroxymethylabietic acid (III)

Conversion of the levopimaric acid-formaldehyde adduct to 6-methylolabietic acid (III). Recrystallized adduct (II) (33 g., 0.1 mole) was dissolved in 50–75 ml. of ethanol (95%) and 6 N hydrochloric acid (5 ml.) was added. The solution, after standing 15 hrs. at room temperature, was diluted with water until no further precipitation occurred. The oil which separated, crystallized on standing. The solids (29.9 g.) were taken up in methanol (25 ml.), heated to the boiling point while adding water to the cloud point, seeded with crystalline hydroxy acid, and set aside to crystallize. The mixture was further cooled in the refrigerator and then filtered; the solid (III) was dried in a vacuum desiccator (27.3 g., 03.2% yield), M.P. 166.5–168°

$[\alpha]_D^{23.8}$ 48.2°, $\lambda_{max}^{ethanol}$ 243 m$\mu$ ($\epsilon$ 24,290)

*Analysis.*—Calcd. for $C_{21}H_{32}O_3$: C, 75.86; H, 9.71; neut. equiv., 332.47. Found: C, 75.86; H, 9.70; neut. equiv., 334.0.

The hydroxy acid was reduced with excess $LiAlH_4$ in ether to the diol The mixture melting point showed no depression with diol (VI) from the $LiAlH_4$ reduction of the resinous product obtained on longer heating of levopimaric acid and formaldehyde (see example 11).

EXAMPLE 5

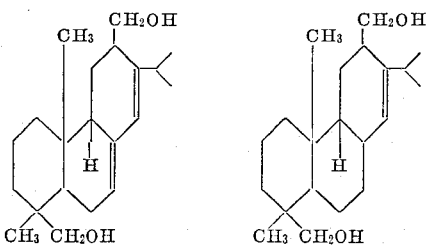

6-hydroxymethylabietic acid (III)   6-hydroxymethyldihydroabietic acid (IV)

Another portion of adduct (II) was converted to 6-hydroxymethylabietic acid (III) and hydrogenated to 6-hydroxymethyldihydroabietic acid (IV) as follows:

Crystallized adduct (II) (525 grams, 11.56 moles, n.e. 336) was mixed with 1500 ml., 95% ethanol and 150 ml. 3 N. hydrochloric acid. The mixture was stirred until solution was completed and then was maintained at 5° overnight. The resulting product was 6-hydroxymethylabietic acid (III). After neutralizing with 150 ml. of 3 N sodium hydroxide the mixture was charged to a pressure reactor with 7.9 grams, 5% palladium on-carbon catalyst (Girdler G 81–C) and reduced with hydrogen at 1000 pounds pressure for 3 hours. The mixture was then heated to 100° and held there for 1 hour. It was removed from the reactor, 5 grams of charcoal added, and filtered hot through a pressure filter. The charcoal and catalyst were extracted in a continuous extractor with ethanol. The combined filtrate and extract were diluted with water to reduce the alcohol concentration to 50% and heated to 80° to give complete solution. The mass was agitated while cooling to room temperature and then maintained at 5° in a refrigerator overnight. The product was isolated by filtration and dried on a steam bath; n.e. 339. The acid was recrystallized by dissolving in 1475 ml. 95% ethanol, diluting with 1325 ml. water, cooling and filtering to isolate product (IV); 505 grams, 96%, M.P. 189–191°. The NMR spectrum of a purified sample showed one proton in the vinyl region.

*Analysis.*—Calcd. for $C_{21}H_{34}O_3$ n.e. 334.27; C, 75.41; H, 10.22. Found: n.e. 336; C, 75.15; H, 10.28. Hydroxyl equivalent calcd. 334.57. Found: 329.0.

EXAMPLE 6

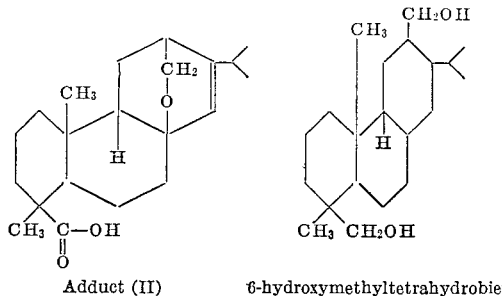

Adduct (II)   6-hydroxymethyltetrahydrobientinol (V) (abietylglycol) (diol) V

Conversion of adduct (II) to 6-hydroxymethyltetrahydroabietinol (V) or abiethyl glycol (V) or diol (V)

Adduct (II) (60 grams, 0.178 mole), n.e. 336, was dissolved in 100 ml. of dioxane and charged to a pressure reactor with 12 grams of Girdler G–13 copper chromite powdered catalyst. Hydrogen, 2500 p.s.i. was added and the batch was heated to 275° and the pressure maintained at 4000–5000 p.s.i. for 4 hours. The mixture was cooled, removed from the bomb, treated with 5 grams of charcoal, heated to obtain complete solution, and filtered through a pressure filter. The filtrate was cooled and the product, in the form of colorless crystals, was isolated by filtration. The filtrate was found, by titration, to contain only 0.56 gram of acid calculated as (IV). The catalyst in the filter cake was extracted in a continuous extractor to remove occluded products. Forty grams, 69.6%, of crystalline (V) was obtained. Evaporation of the solvent from the filtrate gave 15.3 grams of resinous material. This represents a recovery of 96%. In most runs the filtrate was set up for removal by azeotropic distillation of the water formed in the reaction as result of interesterification. The water-free filtrate was fortified with more adduct, catalyst added, and reduction repeated. There was no noticeable drop in yield by recycling residual materials 4 times. The crude glycol was purified by distillation in vacuo, B.P. 192°, 0.2 mm. and crystallization from dioxane; M.P. 179–180°. Direct crystallization from dioxane or acetone gave M.P. 179.5–181°. The glycol was undoubtedly 6-hydroxymethyltetrahydroabietinol (V) since it did not absorb ozone and there were no vinyl hydrogens as evidenced by NMR spectroscopic examination.

*Analysis.*—Calcd. for $C_{21}H_{38}O_2$ (percent): C, 78.05; H, 11.86. Found (percent): C, 78.05; H, 11.86. Hydroxyl equivalent calcd. 161.15. Found: 165.6.

If desired, equivalent amounts of 6-hydroxymethyldihydroabietic acid (IV) may be used as the starting material in place of adduct (II) in the preparation of saturated diol (V) thus completing the fourth step in the series.

It is also within the scope of our invention to use an equivalent amount (57 grams) of the unsaturated (conj.) diol (VI) (see Example 10) as the starting material in Example 6 above for the preparation of saturated diol (V).

EXAMPLE 7

The procedure of Example 6 was repeated except the process was scaled up to 360 grams which gave 1290 grams glycol (V) (4.0 mole) from the initial reduction of 2520 grams adduct (II) (7.54 mole). Drying the filtrate and reworking resulted in an additional 669 grams (V) (2.08 mole) from a second reduction, giving a total of 1959 grams of (V) or an 80.8% yield. An attempt to obtain more glycol from a third reduction gave an oil which was slow to crystallize. This was distilled through a 12-inch column packed with stainless steel helices. The distillate, 392 grams solid, 16.1%, was almost colorless (B.P. constant at 170° C., 0.15 mm.; OHE 260.7). By comparison, tetrahydroabietol (B.P. 154°, 0.1 mm.) was easily separated from the glycol using the same equipment. From this evidence this second material is not a mixture of the glycol and tetrahydroabietol which might be expected since the elimination of formaldehyde from the adduct during the reaction would have resulted in formation of this alcohol. Crystallization of the distillate from ethyl acetate gave a crystalline solid (M.P. 100–101.5°) which contained one hydroxyl and had no ultraviolet absorbance.

*Analysis.*—Calcd. for $C_{21}H_{38}O$ (percent): C, 82.27; N, 12.5; OHE, 306.3. Found (percent): C, 81.73; H, 12.24; OHE, 298.

EXAMPLE 8

In the following example the saturated diol (V) is prepared by hydrogenation of a polyester prepared by heating 6-hydroxymethyldihydroabietic acid (IV).

A polyester of the hydroxyacid (IV) was prepared by heating 60 grams (0.10 mole) acid to 275°, 0.2 mm. pressure for 2 hours. Molecular weight by end group titration was 1800. The residue, a clear colorless resin, M.P. 227–232° was dissolved in 120 ml. dioxane and charged to a pressure reactor with 12 grams Girdler G–13 copper chromite powdered catalyst. Hydrogen was added, 2500 p.s.i. and the batch was heated to 275° for 4 hours maintaining hydrogen pressure at 4000 to 5000 pounds. The batch was filtered and product isolated as in Example 6. By titration, the filtrate contained 0.67 gram of acid (IV) and 50.7 grams (88.5%) of crystalline glycol (V), having a M.P. 179–180° C.

EXAMPLE 9

Utility of 6-hydroxymethyltetrahydroabietinol (V)

Usefulness of the adduct (II), hydroxyacids (III and IV), was demonstrated by making a polyester of the diol (V) and terephthalic acid.

Dimethyl terephthalate, 9.7 g., 6-hydroxymethyltetrahydroabietinol, 16.7 g., cobalt acetate, 4 mg., and lead oxide, PbO, 4 mg., were heated to 250° C., 4 hrs. 10 mm. pressure and finally to 300°, 12 hrs. at 0.5 mm. When cold the residue was a brittle glass which was soluble in dioxane and insoluble in methanol. The original materials were soluble in methanol. The residue was dissolved in 100 ml. hot dioxane and precipitated by pouring into 1 l. cold methanol. Nineteen grams colorless powder was obtained, M.P. 168–70°; inherent viscosity, $\eta_{inh.}$ 0.0374 (0.5% dioxane, 30° C.). A film cast from dioxane was clear, colorless and brittle. When applied to wood from dioxane a glossy, hard finish was obtained.

EXAMPLE 10

In the following example 6-hydroxymethylabietinol (VI) is prepared by reacting a mixture of adduct (II) and 6-hydroxymethylabietic acid (III) with lithium aluminum hydride (LiAlH₄). The procedure follows:

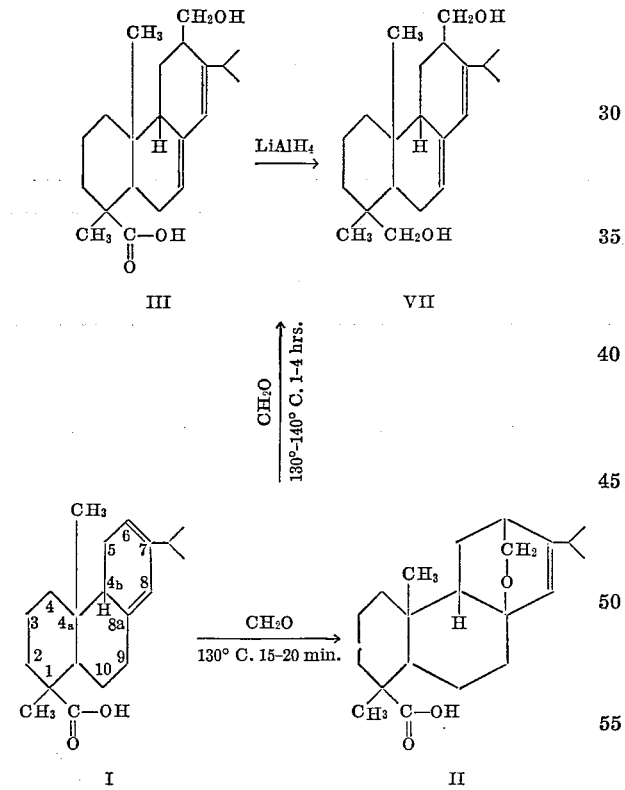

Levopimaric acid (30 g., 0.1 mole) was placed in a flask with paraformaldehyde (6.6 g., 0.22 mole) and stirred with a paddle-type stirrer while heating in an oil bath at 140°. After 50 min., dioxane (75 ml.) was added to solubilize the materials and the mixture was heated at reflux for about 2 hrs. The mixture was cooled, diluted with ether, and washed with water. The ether solution was shaken with sodium sulfate, filtered, and evaporated to a light-colored friable resin which was a mixture of resin acids, adduct (II) and hydroxy acid (III).

*Analysis.*—Calcd. for $C_{21}H_{32}O_3$: neut. equiv., 332; active H equiv. ($H_aE$, grams of sample required to evolve 1 mole of hydrogen on treatment with excess lithium aluminum hydride), 166. Found: neut. equiv., 308; $H_aE$, 194.3.

A 5-g. sample of the material was treated with excess LiAlH₄ in ether and allowed to stand overnight. The mixture was hydrolyzed with excess, dilute, iced hydrochloric acid and the ether solution was washed chloride free with water. The ether solution was dried over $Na_2SO_4$, filtered, and concentrated. A product (VI) having $$\lambda_{max.}^{ethanol}\ 243\ m\mu(\epsilon 23,620), [\alpha]_D^{27}\ -73.7$$

M.P. 179.5–181.3°, was isolated.

*Analysis.*—Calcd. for $C_{21}H_{34}O_2$: C, 79.19; H, 10.76; $H_aE$, 158. Found: C, 79.24; H, 10.63; $H_aE$, 170.

The diol (VI) was converted to the diacetate by either refluxing with excess acetic anhydride or by treatment of a pyridine solution of the diol with a slight excess of acetyl chloride. The diacetate was molecularly distilled at 135° (20μ). The product was a very viscous, water-white liquid, $[\alpha]_D^{27}$ −47.76°.

*Analysis.*—Calcd. for $C_{25}H_{38}O_4$: C, 74.55; H, 9.51; sapon. equiv., 201.3. Found: C, 74.5; H, 9.47; sapon. equiv., 202.

The unsaturated (conj.) diol (VI) may be converted to the saturated diol (V) using the general procedure of Example 6. A mixed melting point with saturated diol (V) shows no depression.

EXAMPLE 11

Conversion of Adduct II to the formaldehyde adduct of abietinol (VII).

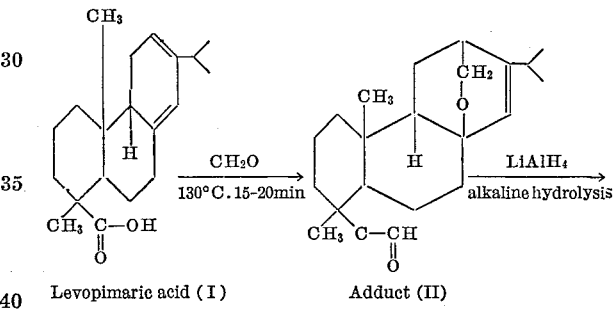

Levopimaric acid (I)     Adduct (II)

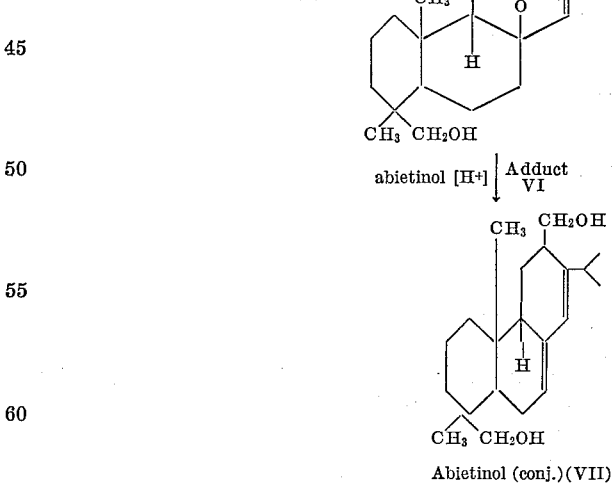

Abietinol (conj.)(VII)

Conversion of adduct II to the hydroxy ether (the formaldehyde adduct of abietinol (VII))

Recrystallized adduct (10 g.) was slurried in dry ether (50 ml.) and added to an ether solution of LiAlH₄ (3 g. in 50 ml.) with rapid stirring. The mixture stood 4 hr. at room temperature and was then hydrolyzed by cautious dropwise addition of 6 N NaOH until the solids clumped to a granular mass. The mixture was filtered; the ether solution of the product was concentrated by evaporation and filtered to yield crystalline (VII) (6.1 g., 60%), M.P. 124–126°, $[\alpha]_D^{27}$ +94.8°.

*Analysis.*—Calcd. for $C_{21}H_{34}O_2$ (percent): C, 79.19; H, 10.76. Found (percent): C, 79.08; H, 10.64.

A small sample of the hydroxy ether was dissolved in 3 vol. of ether and shaken with 1 drop of dilute (3 N) HCl. After about 3 min. crystalline diol precipitated This is conjugated abietinol (VI) and exemplifies another method of the preparation of (VI) of the preceding example as well as an utility for the adduct of abietinol (VII). A mixed melting point with good diol showed no depression.

EXAMPLE 12

In the following example Adduct (II) of Example 11 is hydrogenated to give saturated cyclic ether (VIII).

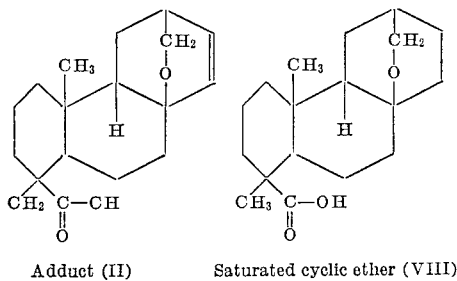

Adduct (II)   Saturated cyclic ether (VIII)

Hydrogenation of levopimaric acid-formaldehyde adduct

The recrystallized adduct (15 g.) was placed in a low-pressure hydrogenator with ethanol (75 ml.) and 5% pelladium-on-carbon catalyst (0.74 g., 5%). Hydrogenation was allowed to proceed overnight at 40–45 p.s.i.g. All of the adduct had dissolved. The mixture was filtered and the product was precipitated by addition of water. A semicrystalline material was obtained. The infrared spectra showed free hydroxyl bands indicating at least a partial opening of the cyclic ether. The material was redissolved in a minimum of 95% ethanol and allowed to stand overnight. A crystalline solid precipitated (3 g., 20%), M.P. 240.9–243.8°, $[\alpha]^{27}_D +106.5°$. No other pure crystalline product was isolated.

*Analysis.*—Calcd. for $C_{21}H_{34}O_3$: C, 75.40; H, 10.25; neut. equiv., 334.49. Found: C, 75.70; H, 10.25; neut. equiv., 337.8.

A quantitative hydrogenation gave a hydrogenation equivalent of 286 (calcd. for $C_{21}H_{32}O_3$, 332). The low value may be a result of partial hydrogenation of the second double bond of the hydroxy acid formed during hydrogenation.

EXAMPLE 13

The adduct of abietinol (hydroxy ether) (VII) or abietinol adduct prepared by the process of Example 11 may be converted by dilute mineral acids to conjugated abietinol (VI), sometimes referred to as diol (VI).

Diol VI may be used in the preparation of a water-resistant, film-forming polyester. The process follows:

"Diol (VI)" (conj.) (7.95 g., 0.025 mole) was mixed with benzene (45 ml.) and diethylamiline (5 ml.) and a solution of sebacylchloride (5.51 g., 0.023 mole) in benzene (10 ml.) was added. The mixture was stirred until all the diol had dissolved and then held at room temperature overnight. The reaction mixture was washed with dilute hydrochloric acid until all the diethylaniline had been removed, dried over sodium sulfate, filtered, and evaporated to a resinous mass. The resin was extracted with acetone, leaving an isoluble oil which dried to a rigid foam in the vacuum desiccator. The foam was soluble in dioxene and had an inherent viscosity of 0.16 at 0.5% concentration. The foam was melted to a clear resin and spread in a thin film on a piece of clear, bare wood. A film was also applied to the wood by evaporation of the dioxane and chloroform solutions of the resin. After standing overnight the piece of wood was submerged in water for 15 hours. At the end of this time all films were still clear and tough, showing no signs of whitening.

EXAMPLE 14

In the following example: 6-hydroxymethyltetrahydroabietinol (a saturated diol) (V) is used to replace in part the customary glycols used in the preparation of polyurethane foams and rubbers.

| | Example | | | |
|---|---|---|---|---|
| | 1 | 2 | 3 | 4 |
| Glycol (V) | (.01 mole) 3.22 g. | 0 | (0.01 mole) 3.22 g. | (.015 mole) 1.83 g. |
| Polyethylene glycol 200 | (.01 mole) 2.0 g. | (.02 mole) 4.0 g. | 0 g. | 0 g. |
| Polypropylene glycol 2000 | 0 g. | 0 g. | (.01 mole) 20.0 g. | (0.005 mole) 10.0 g. |
| Toluenediisocyanate | (.02 mole) 3.48 g. | 3.48 g. | 3.40 g. | 3.48 g. |

(1) The glycols were dissolved in 8 ml. dioxane or toluene, heated to a reflux to expel air and flushed with $N_2$ gas. The diisocyanate was added below 70° C., blanketed with $N_2$ gas and heated to 100° for 20 min. The clear solution was poured into a petrie dish to cast a film. This was cured on a hot plate at about 120° C. for several hours. At 120°, the film was soft enough to dent easily.

(2) This was handled like (1). At 120° C. (1) was harder than (2).

In experiments 3 and 4 the glycols were heated to dissolve the abietyl derivative and degassed. After blanketing with $N_2$ the dissocyanate was added and the batch heated to 100° C. for 20 min.

In each of the four mixtures, one drop of n-morpholine was added and stirred in prior to casting the films.

Films were cast on aluminum sheets and heated to 120° C. to cure as in Example 1.

The results follow:

Barcol Hardness of films: Experiment 1=80; 2=15; 3 was viscous and sticky, hardness=0; 4 tough, rubbery and hardness=75. All the films were clear and colorless.

Samples of 1, 2 and 4 were dissolved in dimethylformamide (DMF) and precipitated by pouring into methanol. The precipitates were dried in vacuo 0.5 (mm., $$50 \text{ °C. } \eta_{\text{inh}}^{0.5 \text{ DMF}}$$

for (1), 0.17; (2) 0.244; (3) not determined; (4) 0.244.

It will be observed that diol (V) (abietyl glycol) may be used to harden and improve polyurethanes from polyethylene and polypropylene glycol ethers—materials currently being used in numerous polyurethane foams and rubbers. As evidenced by experiment 4, useful plastics can be obtained.

We claim:
1. A glycol mixture useful for producing polyurethane plastics when mixed with a diisocyanate, said mixture comprising from about 25 to 75 parts by weight of 6-hydroxymethyltetrahydroabietinol per 100 parts by weight of total glycol, the balance of the glycol mixture being a glycol selected from the group consisting of polyethylene glycol and polypropylene glycol.

References Cited

Parkin et al.: J. Org. Chem., vol. 30, pp. 2356–58 (July 1965).

DONALD E. CZAJA, Primary Examiner

M. J. WELSH, Assistant Examiner

U.S. Cl. X.R.

260—2.5, 24, 77.5, 617.5